F. SEVISON.
TIRE TOOL.
APPLICATION FILED DEC. 23, 1914.
1,154,442. Patented Sept. 21, 1915.
Fig. 1.
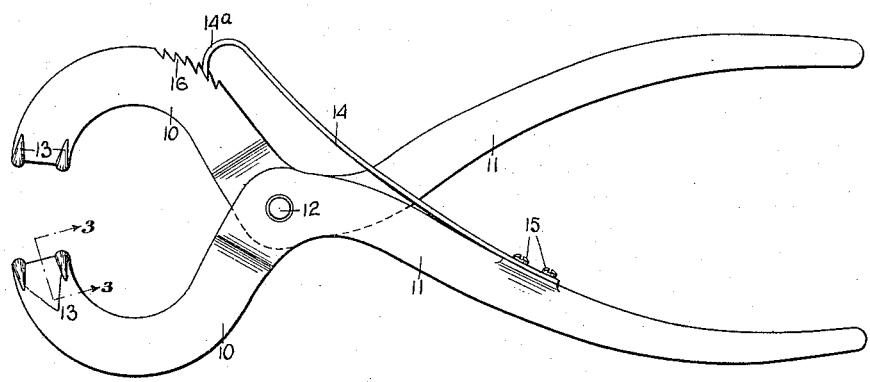
Fig. 2.
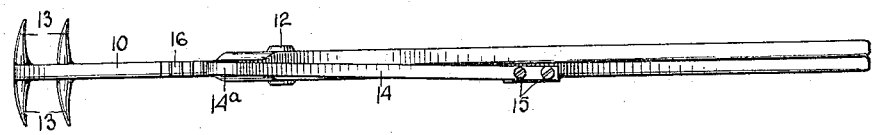
Fig. 4.
Fig. 3.
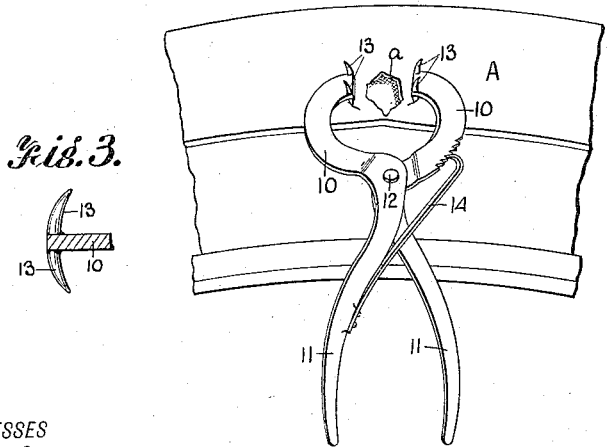
WITNESSES
INVENTOR
Frank Sevison.
BY
ATTORNEYS

UNITED STATES PATENT OFFICE.

FRANK SEVISON, OF MUNCY, PENNSYLVANIA.

TIRE-TOOL.

1,154,442.  Specification of Letters Patent.  Patented Sept. 21, 1915.

Application filed December 23, 1914. Serial No. 878,715.

*To all whom it may concern:*

Be it known that I, FRANK SEVISON, a citizen of the United States, and a resident of Muncy, in the county of Lycoming and State of Pennsylvania, have invented a new and Improved Tire-Tool, of which the following is a full, clear, and exact description.

My invention relates to tools for use in enlarging a cut or puncture in a tire, for the purpose of applying a patch.

The prime object of my invention is to provide a tool for the indicated purpose, whereby to enlarge the cut or opening in the tire without inserting the tool in the said cut or opening.

The invention will be particularly explained in the specific description following.

Reference is had to the accompanying drawings forming part of this specification, in which similar characters of reference indicate corresponding parts in all the views, and in which:

Figure 1 is a plan view of a tool embodying my invention; Fig. 2 is a side view thereof; Fig. 3 is a detail in section on the line 3—3 Fig. 1; and Fig. 4 is a perspective view of the tool in use in repairing a tire.

In Fig. 4 is indicated a portion of a tire A and a puncture $a$ to be repaired. My improved tool serves to distend the tire in a way to enlarge the incision or puncture in the tire by engaging the tire at opposite sides of the puncture or cut, and in a manner to exert a strain over a broad surface so that in distending the tire at the puncture in one direction it will not draw the tire together at the opening in a direction transverse to the strain exerted by the tool.

The tool comprises two opposite jaws 10 having handles 11 pivoted together as by a pin 12 at the base of the jaws 10. The said jaws 10 are curved so that the outer ends of the jaws are disposed in a direction toward each other to open and close by manipulation of the handles 11. On the said jaws 10 at the front edges thereof I provide spurs 13 which curve in an arc and taper to a point; thus the bases of the spurs lie directly adjacent to the front edges of the jaws and curve laterally to overhang in an outward direction with respect to said front edges, so that a spur on one jaw will curve in the opposite direction from the mating spur on the opposite jaw.

The sharp points of the spurs serve to readily penetrate the tire A at each side of the opening $a$. In order that the distention of the tire at opposite sides of the opening $a$ will not be exerted along a single line and tend to draw the walls of the opening together in a transverse direction, I provide a plurality of spurs 13. In the example shown the said spurs are arranged in pairs on each jaw, the spurs of a pair being spaced from each other to lie at different distances from the pivot 12 of the tool; moreover, it is to be noted that the jaws 10 which preferably are flat, are provided with pairs of spurs 13 on both faces, in order that the tool may be applied with either side laid against the tire. The flat formation of the jaws, or at least the forward incurved ends of the jaws provides for the proper disposition of the spurs of a pair.

In practice the tool is applied to a tire so that the opposite pairs of spurs 13 at a particular face of the tool will enter the material of the tire adjacent to the hole $a$ to be repaired, and at opposite sides of the latter, so that by pressing the handles 11 together the engaged spurs on the respective jaws will move outwardly and distend the tire, thereby opening the hole $a$ to the desired extent.

In order to hold the jaws separated and prevent them from being closed by the elasticity of the tire, I provide a spring catch 14 in the form of an elongated resilient shank secured at the rear end to one handle 11 by screws 15, or the like. The forward end of the catch 14 is incurved into hook form as at $14^a$, the free end or bill of the hook being adapted to engage in any one of a series of ratchet teeth 16 on the back of the opposite jaw 10. The shank 14 has sufficient resiliency to permit the bill of the hook to slip over the ratchet teeth 16 as the jaws are separated in distending the tire, and also to permit of the ready disengagement of the hooks to permit the tire to relax.

It is to be understood that the depth of the teeth 13 is such as will not materially injure the tire or puncture the same, but will effect a sufficient engagement with the tire to permit the distention of the latter in enlarging the hole $a$ to the desired extent to receive a plug or patch.

Having thus described my invention, what I claim as new and desire to secure by Letters Patent, is:

1. A tool for repairing tires, comprising two pivotally united handled members terminating in jaws, each jaw having at the front end a curved spur, the spurs of the respective jaws being positioned on the same side face of the tool and being curved oppositely in outward lateral directions to space the pointed ends of the spurs a distance apart to adapt them to simultaneously embed themselves in the material of a tire at opposite sides of a cut or puncture to distend the same without entering the spurs in the cut or puncture.

2. A tool for repairing tires, comprising two pivotally united handled members having jaws at the forward ends, said jaws terminating in front ends disposed inwardly toward each other, each jaw having a plurality of curved spurs on a face of the tool, the spurs on the two jaws being on the same face of the tool, the spurs on the one jaw curving laterally outward in the opposite direction from those on the other jaw and the spurs on the respective jaws having their pointed ends spaced, in the closed position of the jaws, a distance apart to adapt them to be embedded in the material of a tire at opposite sides of a cut or puncture to distend the same without entering the tool in said cut or puncture.

In testimony whereof I have signed my name to this specification in the presence of two subscribing witnesses.

FRANK SEVISON.

Witnesses:
  Dr. La Lloyd,
  F. A. Lloyd.

Copies of this patent may be obtained for five cents each, by addressing the "Commissioner of Patents, Washington, D. C."